United States Patent
Jamgarov

(10) Patent No.: US 6,834,832 B2
(45) Date of Patent: Dec. 28, 2004

(54) AIRCRAFT PROVIDED WITH CARRYING FUSELAGE

(75) Inventor: Stepan Grigoryevich Jamgarov, ul. 11 Parkovaya, d.37, korp. 1, kv.3, Moscow (RU), 105554

(73) Assignees: Stepan Grigoryevich Jamgarov, Moscow (RU); Aubrey Mikhailovich Karklin, Moscow (RU); Sergey Ivanovich Bogdanov, Moscow (RU); Galina Vladimirovna Kalygina, Moscow (RU)

( * ) Notice: Subject to any disclaimer, the term of this patent is extended or adjusted under 35 U.S.C. 154(b) by 192 days.

(21) Appl. No.: 10/399,150
(22) PCT Filed: Dec. 29, 2000
(86) PCT No.: PCT/RU00/00542
§ 371 (c)(1),
(2), (4) Date: Apr. 14, 2003
(87) PCT Pub. No.: WO02/30743
PCT Pub. Date: Apr. 18, 2002

(65) Prior Publication Data
US 2004/0031881 A1 Feb. 19, 2004

(30) Foreign Application Priority Data
Oct. 13, 2000 (RU) .................................. 2000125700

(51) Int. Cl.$^7$ ................................................ B64C 1/00
(52) U.S. Cl. ................. 244/117 R; 244/119; 244/13; 244/36
(58) Field of Search ........................ 244/117 R, 119, 244/4 R, 12.1, 13, 36

(56) References Cited

U.S. PATENT DOCUMENTS

| | | | |
|---|---|---|---|
| 3,586,266 A | | 6/1971 | Bucher |
| 4,925,132 A | | 5/1990 | Zider |
| 5,769,358 A | * | 6/1998 | Hahl et al. ............... 244/36 |
| 6,098,922 A | * | 8/2000 | Hahl ....................... 244/36 |
| 6,378,803 B1 | * | 4/2002 | Saiz ........................ 244/36 |
| 6,568,632 B2 | * | 5/2003 | Page et al. ............... 244/36 |
| 6,634,594 B1 | * | 10/2003 | Bowcutt .............. 244/35 A |

FOREIGN PATENT DOCUMENTS

| | | |
|---|---|---|
| DE | 27 35 652 | 2/1979 |
| DE | 0 514 650 | 11/1992 |
| DE | 41 16 524 | 11/1992 |
| EP | 0 273 466 | 7/1988 |
| RU | 2104215 | 2/1998 |
| WO | 97/43175 | 11/1997 |

* cited by examiner

*Primary Examiner*—J. Woodrow Eldred
(74) *Attorney, Agent, or Firm*—Jacobson Holman PLLC

(57) ABSTRACT

The invention relates to aircrafts, in particular to aircrafts, which are embodied in a passenger, cargo or cargopassenger variants thereby making it possible to improve performance characteristics by improving the aerodynamic properties thereof. The inventive aircraft having a carrying fuselage comprises a wing, an engine, and a fuselage whose width considerably exceeds the height thereof. A lower surface of the basic and the tail parts of the fuselage have a caved-in form in a cross-section thereof. A lower surface of the flattened front part of the fuselage is arranged at an attack angle with respect to the longitudinal horizontal plane of the aircraft. In addition, the front part of the aircraft has a curvilinear form in the plan view, which successively passes from the narrow front part to the basic large part of the fuselage. A tail group is embodied in the form of a double tail fins which are mutually spaced at a distance of the fuselage width with respect to the longitudinal vertical plane of the aircraft and are mounted at an angle with respect to said vertical plane of the aircraft.

7 Claims, 3 Drawing Sheets

AIRCRAFT PROVIDED WITH CARRYING FUSELAGE

Figure 1:
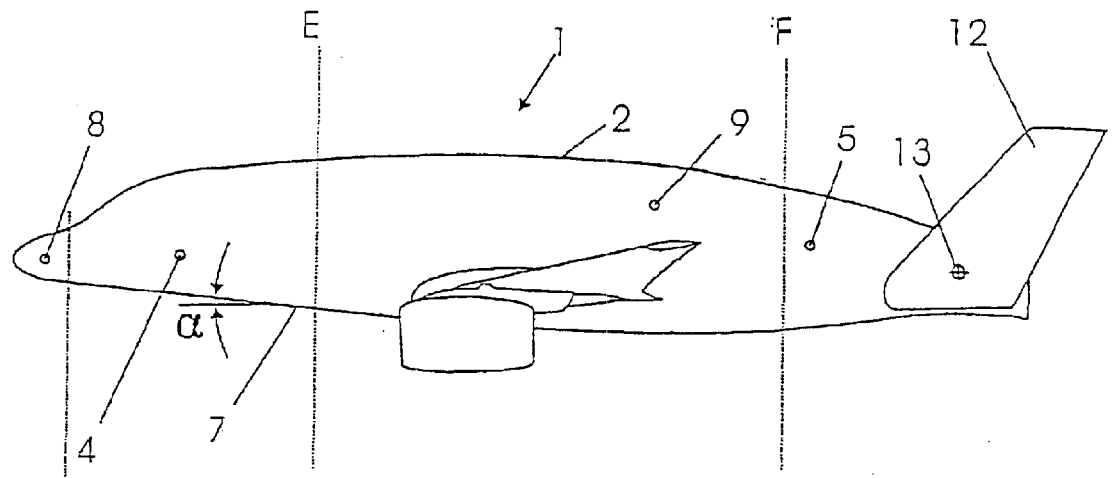

This is a nationalization of PCT/RU00/00542 filed Dec. 29, 2000 and published in Russian.

The invention relates to flying vehicles, namely to aircrafts which are embodied in passenger, cargo and/or cargo-passenger variants; they solve the task of improving flight characteristics by raising the aerodynamic efficiency, improving arrangement and by simplifying operational use.

At present a great many aircraft manufacturers solve the problem of raising the efficiency of cargo- and passenger carriage, which comes in the wake of the air carriers' demand to effect a cost saving in flights. The passenger and transport aircrafts provided with narrow- and wide fuselages are manufactured according to the traditional configuration, in which a comparatively large-span wing is to play the main role in creating a lift force while the fuselage serves, in the main, the function of accommodating the passengers and cargo A further QA'd raising of the efficiency of carriage within the framework of traditional configurations is impossible because an increase in the load-lifting capacity of such aircrafts practically leads to a proportional increase in overall dimensions, weight and fuel consumption. Various modifications introduced into new designs are normally associated with minor improvements of an L/D ratio, say, by changing the contouring and extension of the wing thereby to improve its streamlining with an approach flow cannot drastically change the situation evolved.

Besides this, in circular fuselages or those close to circular section, a high density of freight arrangement cannot be provided, a factor that results in losses of large net volumes.

Known in the art are aircraft structures of great load-carrying capacity (Cf. U.S. Pat. No. 4,925,132, 1990; German Patent 4116524, 1992; European Patent 0514650, 1992) in which a disclosure is made of a large-volume fuselage close to circular section, having several decks for various cargo/passenger compartments.

The conventional lay-outs solving the task of increasing a passenger capacity and cargo tonnage cause grave complications and make heavy the aircraft. Operation is further complicated, as is the maintenance of the structure itself and/or service of the passengers. At the same time, it seems impossible to compensate a high cost of aircraft construction during operation thereof in the aforementioned designs, because one fails considerably to improve the flying qualities of the aircraft.

Also known are aircrafts made according to the so-called "canard" and "flying wing" configuration. (Cf. German Patent 2735652, 1979), which permit dispensing with a traditional fuselage and have a high L/D ratio. Nevertheless, no reduction in structural weight occurs thereat, and in the case of passenger and cargo-passenger aircrafts of small dimensions (up to 100 passengers) there is observed an obvious growth of design weights. In such aircrafts, complicated operational use is associated with the loading and unloading of cargo and passengers. Also, the aircrafts having such configurations are complexly trimmed and controlled under certain flight conditions.

The closest technical solutions to the invention, as being claimed and as set forth in the application, are those of the aircraft designs, as shown and described in U.S. Pat. Nos. 5,769,358, 6,098,922, in which the so-called "lifting" fuselage accounts for a sufficiently great part in the composite lift of the aircraft. In the prior art configurations, as proposed, the fuselage has, in cross section, roughly an elliptical periphery with a large horizontal axis. A width of the fuselage considerably exceeds its height. Owing to the carrying capacity of the fuselage, a wing span can be reduced and, hence, wing weight and overall dimensions. A rear of the fuselage has a part being deflected so as to provide controllability and a top surface of the rear has a fin to be supplemented with aerodynamic horizontal surfaces performing the function of stabilizers.

Notwithstanding some problems dealing with the strength of a fuselage, the present construction enables one to scale down aircraft dimensions considerably, to vary arrangements thereof which are associated with a possibility of separating the fuselage into lengthwise compartments and, more importantly, the possitive aspects of traditional configurations connected with the comforts and conveniences of assembly and operational use of systems and units and also accommodation of passengers and engines lay-out can be used in said configuration as well.

However, in known U.S. Pat. Nos. 5,769,358 and 6,098,922, the implementation of configuration of the external fuselage lines is not good enough to create a really great lift force, because an elliptical cross section through the overall length of the fuselage will not secure the required streamlining by an airstream in solving this task. This defect is particularly attributed to the nose section of an aircraft where the configuration, as shown and described in the US patent, will not provide a smooth flow around without stalling under different flight conditions, take-off included.

For said tasks to be solved, an aircraft is proposed that is provided with a lifting fuselage whose width considerably exceeds its height, more particularly, the ratio of a width of the fuselage to its height is $\geq 2$; a bottom surface in the cross section of the main and rear parts of the fuselage has a concave shape in a direction into the fuselage; the flattened bottom surface of said fuselage forepart is disposed at an angle of incidence to a longitudinal horizontal plane, in the preferable variant this angle is $\geq 4°$; in a more preferable variant—5–7°; the forepart of the fuselage, a plan view, has a curvilinear shape smoothly merging from a more narrow nose section with the main wide part of the fuselage having in a preferable variant, a shape close to an S-like one; the tail unit of the aircraft is implemented in the form of two fins spaced edgewise of the fuselage sidewardly of a longitudinal vertical plane and given an angle to said vertical plane, more specifically, installed angularly $\geq 10°$; in a more preferable variant –20°; the longitudinal vertical sections of the fuselage are normally aerofoil profiles disposed at an angle of incidence $\geq 2°$; the rear part of the fuselage may have a surface to be deflected with respect to a horizontal axis of rotation.

Figure 2:
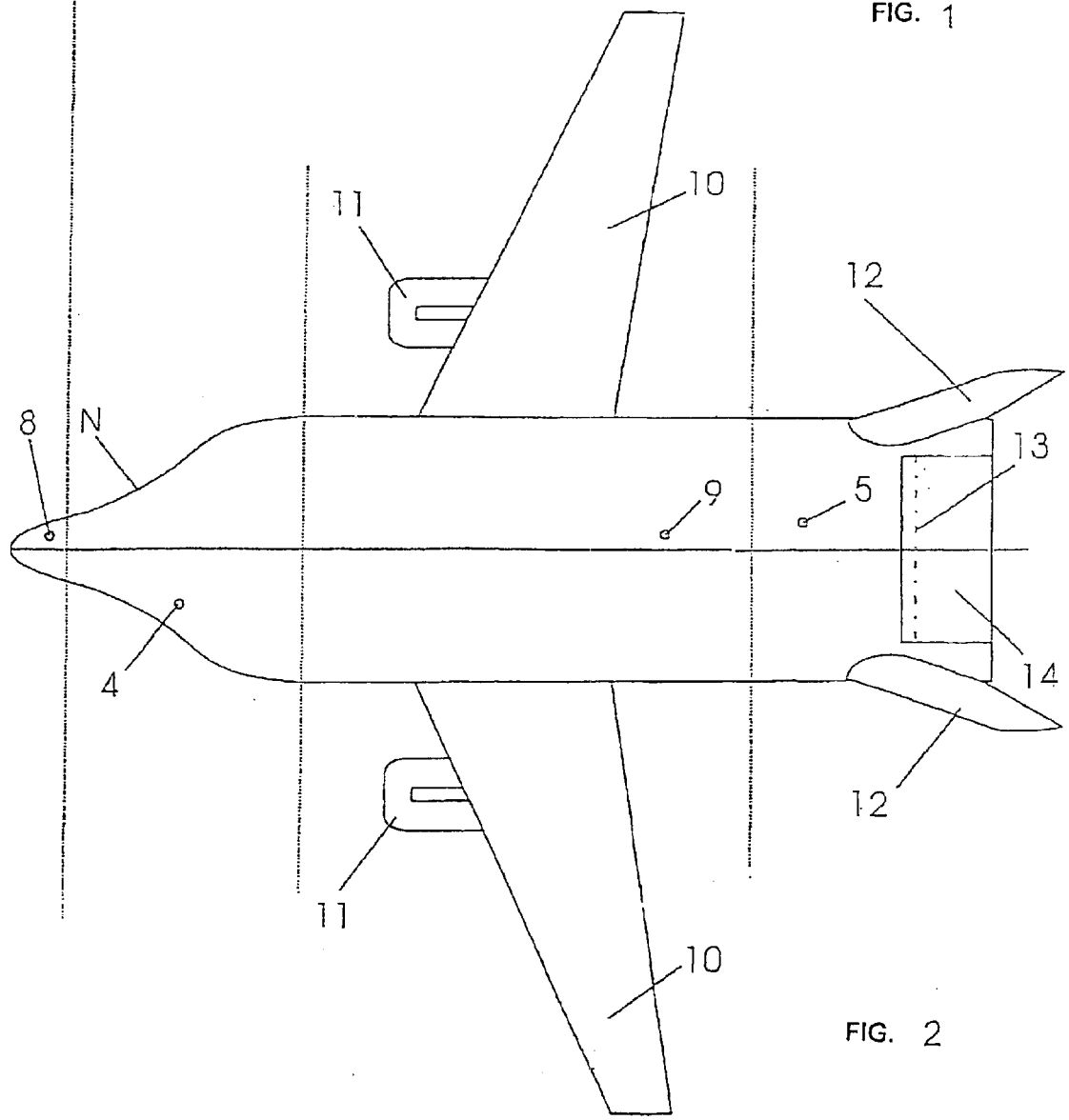
Figure 3:
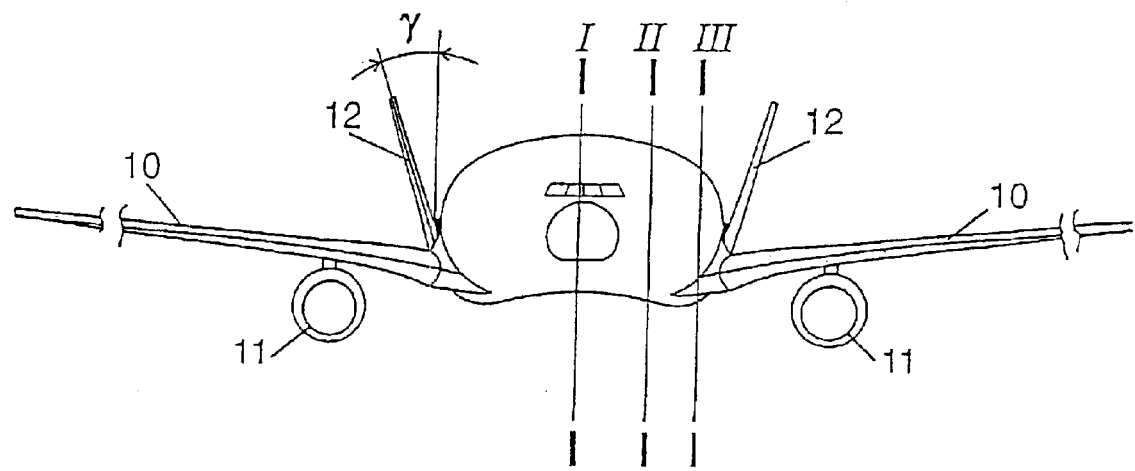
Figure 4:
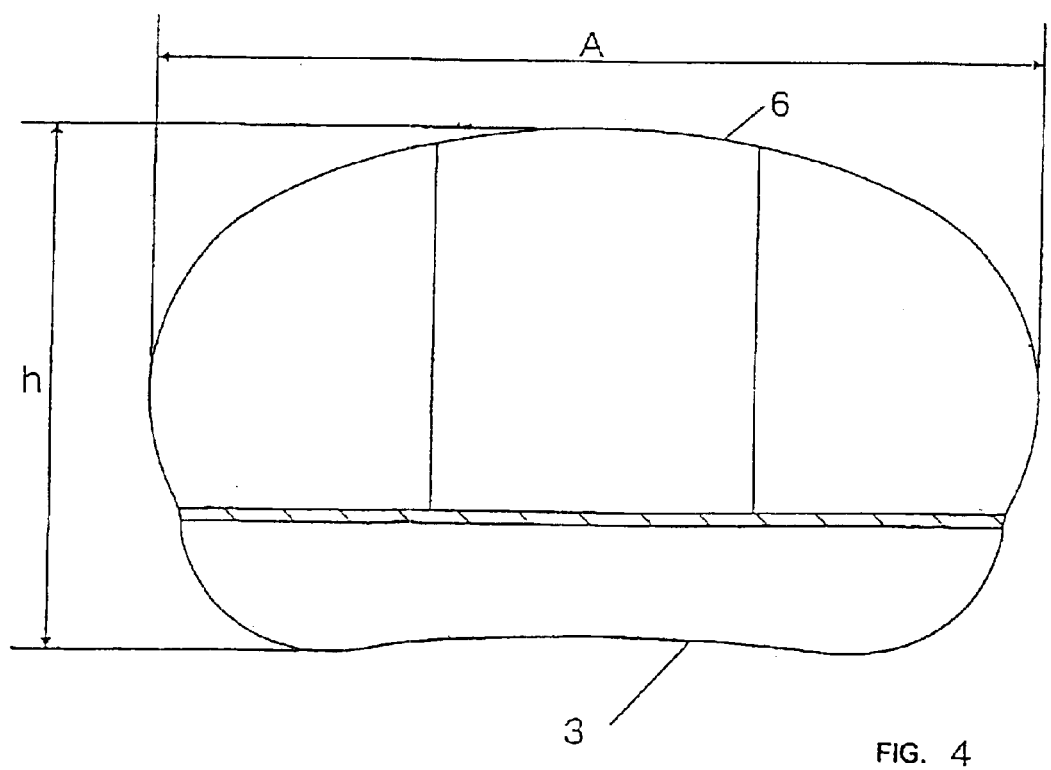
Figure 5:
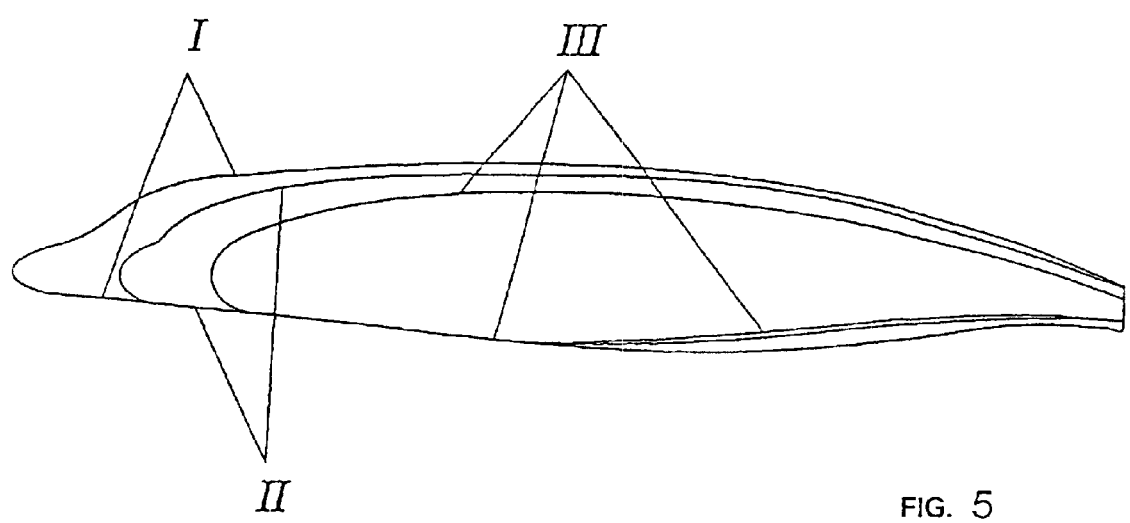

The invention will further be described in the description and with reference to the accompanying drawings in which:

FIG. 1—an aircraft, a side view, according to the present invention;

FIG. 2—an aircraft, a plan view, in FIG. 1;

FIG. 3—a front view of said aircraft;

FIG. 4—a cross section of a fuselage in the main part thereof;

FIG. 5—longitudinal vertical sections of the fuselage I, II, III in FIG. 3.

Shown on the drawings is an aircraft I of the present invention. The aircraft I has a fuselage 2 in which width A in cross section much exceeds height h.

In a preferable embodiment, a $$\frac{A}{h}$$

ratio is ≧2.

A bottom surface 3 in the cross section of the main and rear parts of the fuselage 2 is made concave into the fuselage. This concavity is practically symmetrical of the longitudinal vertical plane of the aircraft. At the edges of the cross section, the concavity smoothly meets with the lateral sides of the fuselage. The cross section of the fuselage 2 from a forepart 4 (which part is roughly limited by conventional line E) is increased first and then decreased at different levels, approximately from the middle of a fuselage length to a rear part 5 (which part is limited by conventionally shown line F) (Cf. FIGS. 4 and 5). A top surface 6 of the fuselage 2 is implemented traditionally convex sidewardly of the fuselage. A flattened bottom surface 7 of the forepart 4 is mounted at an angle a of incidence to the horizontal plane of the aircraft I, which angle of incidence in a preferable embodiment is ≧4° and between 5 and 7°—in a more preferable embodiment. In plan, a maximum width line of a narrow nose section 8 of the fuselage 2 has a curved shape smoothly merging with the main wide part. This curvature can approximate an S-like shape. The fuselage 2 has roughly constant width A over a main part 9 and, as usual, the rear part 5, too. The longitudinal vertical sections of the fuselage 2 (Cf. FIG. 5) represent aerofoil profiles set at an angle β of incidence which is ≧2° in a preferable embodiment in cruising flights. A wing 10 of small or average sweepback has an outboard little wing panel span in comparison with traditional lay-outs for the given class of aircrafts. In the lay-out, as submitted, two turbojets 11 are fixed on the wing 10, albeit it is to be understood to mean that possible are other engine mounting lay-outs, a different number of engines and a different type thereof.

The rear part 5 has fins 12 spaced edgewise of the fuselage 2 and arranged angularly γ to the aircrafts longitudinal vertical plane aidewardly of thia plane. In a preferable embodiment, angle γ is ≧10° and ~20°—in a more preferable embodiment. The rear part 5 may have a surface 14 to be deflected upwardly or downwardly of a horizontal axis 13.

The aircraft I of the present invention gains an additional lift increment in flight owing to the expanded edgewise fuselage 2, i.e. the aircraft has the so-called lifting fuselage. Calculations show that with a width A to height h ratio ≧2, a per cent lift force component of the fuselage 2 of the composite lift reaches nearly 40%, a factor that is facilitated by not only said A/h ratio but also the concavity of the bottom surface 3 of the fuselage 2 that leads to holding the air getting underneath this surface and to preventing it from flowing on all sides thereby to create a permanent air cushion supporting the fuselage 2 and the aircraft I in flight as a whole.

For enhancing the effect of creating a lift force on the fuselage 2, the forepart 4 in plan has a curvilinear shape smoothly merging with the main wide part of the fuselage. This shape of the forepart 4 provides for an air flow incoming onto the top surface 6 without separation and cross-spreading thus securing a stable flow around the fuselage. Said curvature of the forepart 4, a top view, can be adapted to suit the contour close to S-shaped in such a way as to create certain cavity N in a direction to the fuselage at the place of a narrow extended nose section matching with a transition region of the fuselage. This form of transition contributes to said inseparable flow in this region.

The bottom surface 7 of the forepart 4 of the fuselage 2 is disposed such that in cruising flight it forms an angle a of incidence which, according to improved calculations, in a preferable variant is ≧4°, and between 5 and 7°—in the most preferable variant This way of mounting the forepart 4, just like the embodiment of the fuselage 2 having longitudinal vertical sections in the form of aerofoil profiles forming an angle B of incidence permits making use of the possibilities of the lifting fuselage 2 at a maximum in creating a lift force and obtaining a high aerodynamic efficiency of the aircraft as a whole, since all of its washed surface practically contributes to creating the lift. As can really be seen from prior art, an angle of wing setting on the aircrafts of said type is generally taken greater than 2°. Calculations show that a most acceptable angle of incidence for the lifting fuselage 2 is ≧2°, too.

The embodiment of the fuselage 2 in the present invention, extended edgewise and having a great lift force makes it possible to reduce considerably the wing 10 span and the total weight of the aircraft, which is also attributed to the fact that in a wide fuselage, passenger and/or cargo compartments are arranged across the entire sufficiently large width of the fuselage 2 and, more importantly, this factor, in the case of the same passenger seat capacity and cargo amount, as in traditional aircrafts, allows one to provide a shorter fuselage. For example, the aircraft (100 passenger seat capacity) having a configuration of the present invention may have the length of 23 m instead of 30 m characteristic of aircrafts B-737-500 and TU 234-100.

Be it noted that the problems of trimming and controllability of the aircraft I can efficiently be handled with the aid of the fins 12 spaced edgewise of the rear part 5 of the fuselage 2 and set at angle γ to the vertical plane. Said fins 12 also perform the function of rudders and stabilizers. In addition, the surface 14 of the rear part 5 that is deflected relative to the horizontal axis 13 improves the possibilities of control elements to work under optimum conditions. On setting the fins 12 at an angle γ of ≧10°, especially 20°, the trimming and controllability of the aircraft I seems the most preferable.

The aircraft I of the present invention displays service properties which are much more advantageous in comparison with the analogues thereof. In addition to the aforesaid reduction of overall dimensions and weight and, hence, of total costs in flight operations, the aircraft of interest may have many various lay-outs which improve the efficiency and convenience in operational use thereof.

The pressure cabin on edge can be separated by vertical partitions or walls into individual longitudinal compartments both passenger and freight ones. Passengers, cargo, baggage and the mails are arranged on one deck while a space under the floor is made use of for providing an undercarriage and equipment (and may be nonpressurized). More, practically all the assemblies of aircraft systems are disposed in the compartments above a single deck, which leads to an appreciable economy of technical and financial means for air carriers.

What is claimed is:

1. An aircraft provided with a carrying fuselage comprising a wing, an engine, a fuselage, a width of which considerably exceeds its height, a bottom surface of the main and rear parts of the fuselage, in cross section, having a concave shape into the fuselage while a bottom surface of a fuselage flattened forepart being disposed at an angle of incidence to a longitudinal horizontal plane of the aircraft, the forepart of the fuselage, a plan view having a curvilinear shape smoothly merging from a more narrow nose section with the main wide part of the fuselage, a tail unit being formed as two fins spaced edgewise of the fuselage sidewardly of a longitudinal vertical plane of the aircraft and forming an angle to said vertical plane of the aircraft.

2. The aircraft of claim 1, characterized in that the longitudinal vertical sections of the fuselage represent aerofoil profiles set at an angle of incidence $\geqq 2°$ throughout each and every section.

3. The aircraft of claim 1, characterized in that the curvilinear-in-plan shape of the fuselage forepart is configured close to S-like.

4. The aircraft according to claim 1, characterized in that the ratio of a fuselage width to its height is $\geqq 2$.

5. The aircraft according to claim 1, characterized in that a rear part of the fuselage has a surface being deflected relative to a horizontal axis of rotation.

6. The aircraft according to claim 1 characterized in that the angular setting of each fin from the vertical plane is $\geqq 10°$, most preferably about 20°.

7. The aircraft according to claim 1 characterized in that a bottom surface of a fuselage flattened forepart is mounted at an angle of incidence $\geqq 4°$, most preferably at an angle of from 5 to 7°.

* * * * *

UNITED STATES PATENT AND TRADEMARK OFFICE
CERTIFICATE OF CORRECTION

PATENT NO. : 6,834,832 B2
DATED : December 28, 2004
INVENTOR(S) : Jamagarov et al.

It is certified that error appears in the above-identified patent and that said Letters Patent is hereby corrected as shown below:

<u>Title page,</u>
Item [73], Assignees, change "Aubrey" to -- Andrey --.

Signed and Sealed this

Twenty-fourth Day of May, 2005

JON W. DUDAS
*Director of the United States Patent and Trademark Office*